UNITED STATES PATENT OFFICE.

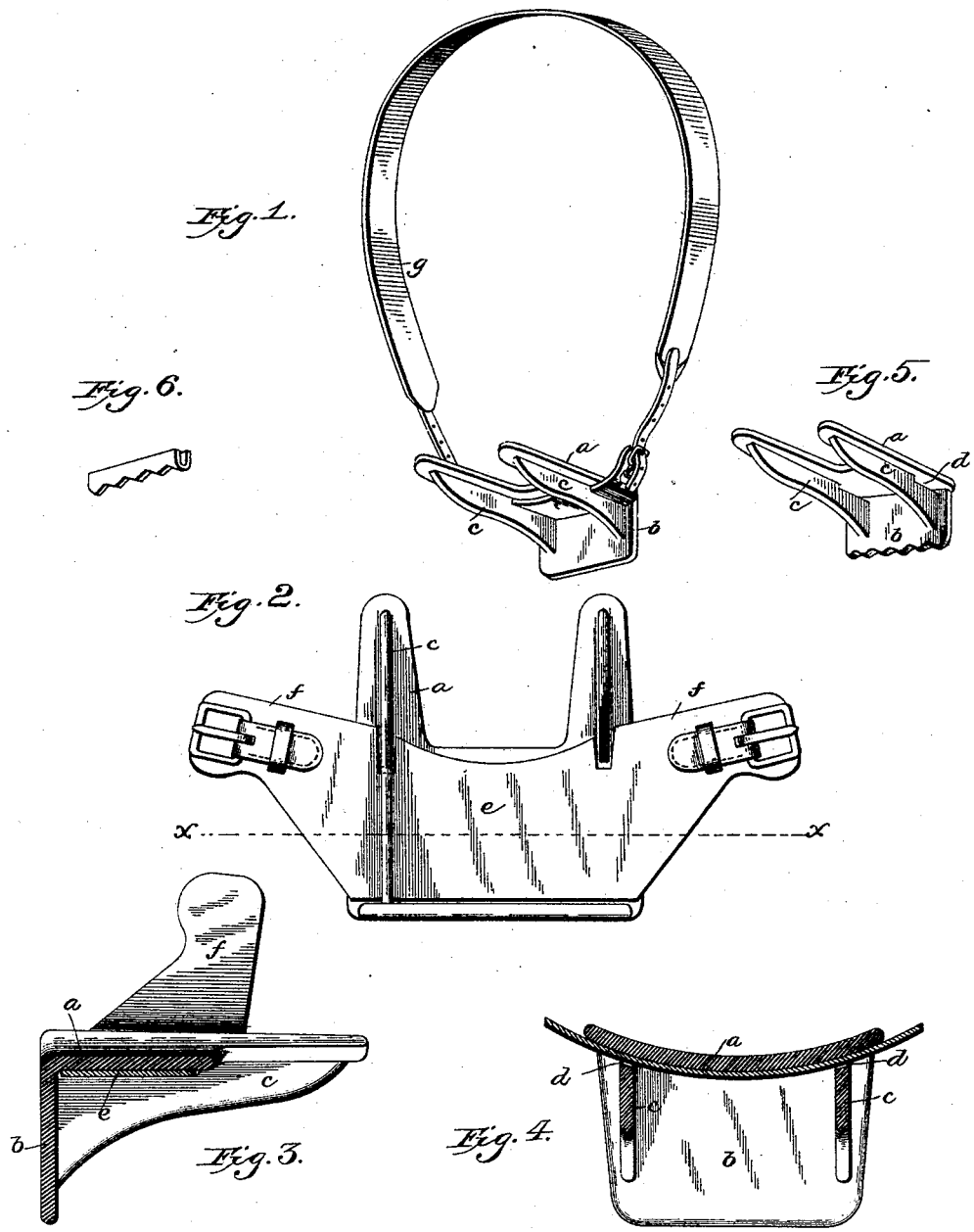

JOSEPH F. VAN NESS, OF GLOVERSVILLE, NEW YORK.

VETERINARY SURGICAL DEVICE.

SPECIFICATION forming part of Letters Patent No. 435,468, dated September 2, 1890.

Application filed January 2, 1890. Serial No. 335,604. (No model.)

*To all whom it may concern:*

Be it known that I, JOSEPH F. VAN NESS, a citizen of the United States, residing at Gloversville, in the county of Fulton and State of New York, have invented a certain new and useful Improvement in Veterinary Surgical Devices, of which the following is a full, clear, and exact description.

This invention relates to a device for preventing self-abuse in stallions.

The objects of the invention are to provide such a device which will be as nearly as practicable self-adjusting to the animal, and which while sufficiently rigid to accomplish the purpose of prevention of self-abuse will at the same time remove liability of injury to the animal.

The invention consists in a soft-rubber device for this purpose combined with an adjusting jacket and strap, all substantially as I will proceed now more particularly to set forth, and finally claim.

In the accompanying drawings, illustrating my invention, in the several figures of which like parts are similarly designated, Figure 1 is a perspective. Fig. 2 is a bottom plan view, with a portion of one of the braces broken away. Fig. 3 is a longitudinal section. Fig. 4 is a transverse section taken in the plane of line $x$ $x$, Fig. 2. Fig. 5 is a perspective of a modification, and Fig. 6 is a perspective view of another modification.

The shield $a$ is furcated at one end so as to fit the sheath of the animal, and by preference has a curvature substantially such (more or less) as indicated in Fig. 4. A guard $b$ depends from the shield $a$ and is integral therewith, and the shield and guard are re-enforced or braced by the braces $c$. The device having these essential characteristics is molded in one piece of soft rubber of sufficient thickness, strength, and rigidity to subserve the purposes of the invention, and yet not so hard and unyielding as to injure the animal.

By making the device of rubber it may conform more closely to the animal's belly and his parts than were it made of any rigid material. Moreover, being in one piece, it may be more readily cleansed than if made of a number of connected parts, and more readily cleansed simply by the application of water.

The edge of the guard may be variously formed. I have shown it straight in Fig. 1, and in Fig. 5 I have shown it made corrugated. It may be given any desirable shape.

In Fig. 6 I have shown an attachable edge for the guard, which is made with teeth and may be made of hard rubber or other hard substance, and where it is to be used upon an animal of very bad habits, it may be of metal.

The braces $c$ are provided with slots or openings $d$, through which the jacket $e$, of leather or other suitable material, is passed. This jacket fits closely in underneath the shield $a$, and has its ends extended beyond it and provided with buckles $f$ or other means for receiving the ends of an adjustable strap $g$, whereby the device may be easily applied to an animal. The jacket $e$, being of flexible material and the device also being flexible, it is obvious that the whole thing, by pressure upon the strap $g$ in attaching it to an animal, may be made to conform very closely and nicely to the animal, so as to prevent displacement.

The jacket $e$, as shown in Fig. 1, is of such shape as to effect absolute self-adjustment of the device and to insure its conformation to all deflections of the parts by angular strains and tension.

This device being flexible and perfectly adjusted, as hereinbefore described, is perfectly harmless, whether the animal is reclining or standing, and chafing and irritation are impossible. It is so adjusted as in no way to interfere with any of nature's functions or requirements.

What I claim is—

1. A veterinary surgical device comprising a furcated shield, a depending guard, and slotted braces made integral and of soft rubber, combined with a flexible jacket secured to the device by insertion in the slots, and an adjusting-strap applied to the jacket, substantially as and for the purpose described.

2. A veterinary surgical device having a depending guard and a serrated or otherwise roughened edge appliance detachable therefrom, substantially as described.

In testimony whereof I have hereunto set my hand this 21st day of December, A. D. 1889.

JOSEPH F. VAN NESS.

Witnesses:
JOHN M. DRURY,
NELSON H. ANIBAL.